June 15, 1965   W. HEER   3,189,389
BEARING
Filed Oct. 26, 1961   3 Sheets-Sheet 1
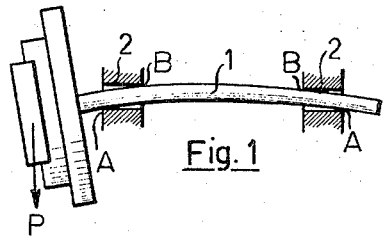
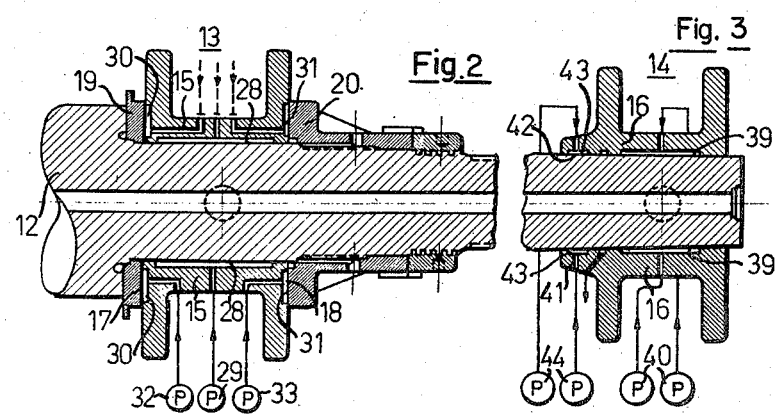
INVENTOR.
WALTER HEER
BY Dodge and Sons
Attorneys.

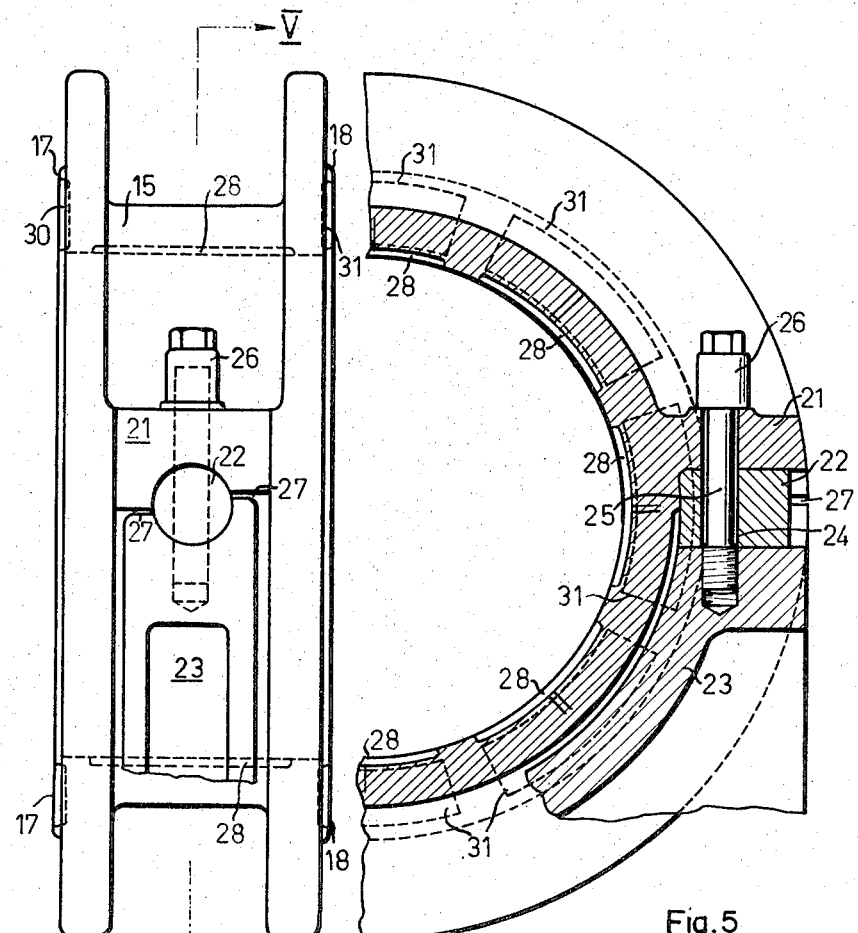

June 15, 1965 W. HEER 3,189,389
BEARING
Filed Oct. 26, 1961 3 Sheets-Sheet 3

INVENTOR.
WALTER HEER
BY Dodge and Sons
Attorneys.

3,189,389
BEARING
Walter Heer, Zurich, Switzerland, assignor to Escher Wyss Aktiengesellschaft, Zurich, Switzerland, a corporation of Switzerland
Filed Oct. 26, 1961, Ser. No. 147,919
Claims priority, application Switzerland, Nov. 10, 1960, 12,551/60
8 Claims. (Cl. 308—9)

This invention relates to a bearing for a shaft and the application of this bearing to the spindle of a machine tool, more particularly a lathe.

In order to obtain high machining accuracy, efforts are made in machine tools to avoid as far as possible deformations of the individual parts under the applied loads. Lathe spindles, for example are therefore made as resistant to bending as possible.

Heretofore, however, too little attention has been paid to the fact that any spindle, even though made with a relatively large diameter, bends on the application of a load. It has been shown that when heavy workpieces are mounted on a spindle, the latter, may set itself appreciably obliquely in its bearings, as shown in FIG. 1 with reference to the example of a lathe spindle. Here, 1 denotes the spindle which is carried in bearings 2 of the headstock. The spindle 1 bends, due to the load P on the spindle end. At points A and B, therefore, it bears with increased pressure against the bearing surfaces.

Metallic contact of the spindle with the bearing at the particular points may give rise not only to operating troubles, but also increased bearing wear at these points, so that even a straight spindle no longer rests uniformly in the bearing.

In the mounting of a shaft, the present invention obviates these disadvantages by the fact that the shaft is freely adjustable in its inclination in the bearing when deflected by the applied load.

Figure 6:
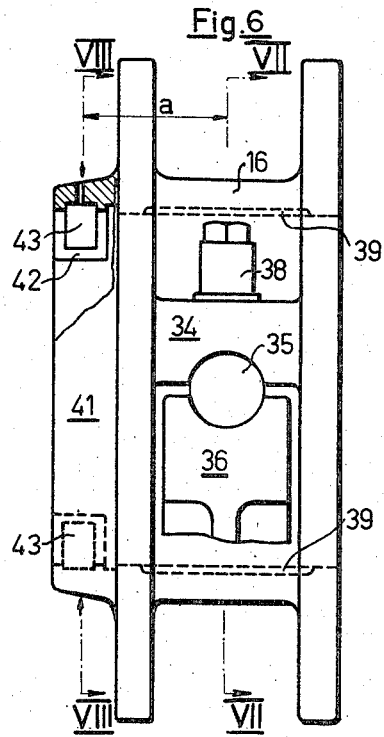
Figure 7:
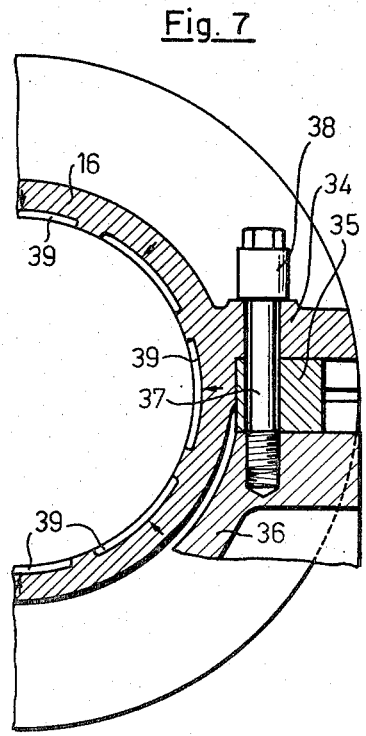
Figure 8:
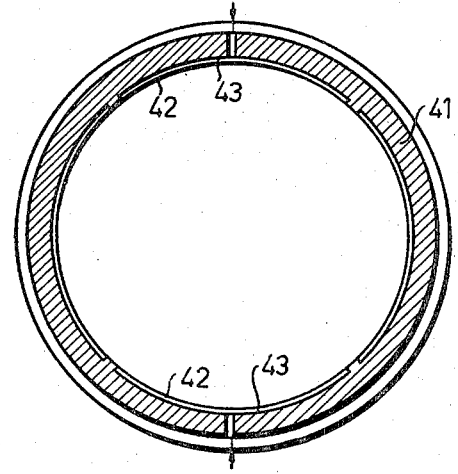

The invention will be described having reference to the accompanying drawings in which:

FIG. 1 is a schematic showing illustrative of the bearing problems solved by applicant, FIGS. 2 to 8 represent in simplified fashion constructional examples of the subject of the invention as applied to the mounting of a machine-tool spindle, FIG. 2 is an axial section of one embodiment of the invention, FIG. 3 is an axial section of a modification of the invention, FIG. 4 one of the bearings of the constructional form according to FIG. 2 in elevation on a larger scale, FIG. 5 a section on the line V—V of FIG. 4, FIG. 6 the other bearing of the constructional form according to FIG. 3, in elevation on a larger scale, FIG. 7 a section on the line VII—VII of FIG. 6, and FIG. 8 a section on the line VIII—VIII of FIG. 6.

According to FIGS. 2 to 8, the horizontal-axis spindle 12 of a lathe is mounted in two radial bearings 13 and 14 having bearing bushes 15 and 16 of adjustable inclination. The bearing bush 15 of the bearing 13 has in addition bearing faces 17 and 18 extending on both ends in planes at right-angles to the spindle axis for receiving the axial thrust and co-operating with rings 19 and 20, respectively, forming shoulders of the spindle 10.

As will be seen from FIGS. 4 and 5, adjustability of the bearing bush 15 is obtained by the fact that it is mounted by means of lateral projections 21 in two pivots 22, the axes of which are at right-angles to the spindle axis and at right-angles to the vertical plane. The vertical plane is here the preferred pivoting plane, since the weights of the workpieces to be machined cause deflection of the spindle in this plane. Only one of the pivots 22 is shown in the drawing. The other would be situated symmetrically thereto with respect to the vertical plane passing through the spindle axis.

The projections 21 of the bearing bush 15 are provided on their underside with recesses of approximately semicircular cross-section, in which the upper halves of the pivots 22 engage. The lower halves of the pivots 22 rest in recesses of approximately semicircular cross-section of a fixed bearing member 23 of the headstock.

The pivot 22 is provided with a vertical bore 24, through which passes with clearance a bolt 25 screwed into the fixed bearing member 23. The bolt 25 also passes through the projection 21 of the bearing bush 15. On the upper end of the bolt is a nut 26, which presses this projection 21 against the pivot 22, but only so strongly that in operation, the bearing bush 15 cannot be lifted upwardly.

The slender bolt 25 is so little resistant to bending that in the angular range coming into consideration, it offers no appreciable resistance to rotation of the bearing bush about the axis of the pivot 22. To permit such rotation, a clearance 27 is also provided between the projection 21 of the bearing bush 15 and the supporting element 23.

The surfaces 17, 18 of the axial bearing act at the same time as control surfaces for automatic adjustment of the bearing bush 15 according to the inclination of the spindle 12. If this inclines for example downwardly on the left of the bearing 13 (FIG. 2), the ring 19 will be pressed more strongly on the lower side against the surface 17 of the bearing bush 15 than on the upper side. A torque will thus be exerted on the bearing bush 15 in respect of the axes of the pivots 22 and will adjust the bearing bush in accordance with the inclination of the spindle. The ring 20 co-operating with the face 18 acts in a corresponding manner.

Advantageously, hydrostatic bearings of a kind known per se will be used. Accordingly, the bearing surface of the bearing bush 15 is provided with pockets 28 distributed on the periphery and forming liquid pads by means of lubricant supplied under pressure. Each of these pockets is supplied with lubricant by means of a separate pump 29 in accordance with FIG. 2, delivering a definite quantity of liquid to the respective pockets.

A particular advantage is obtained by providing also the end surfaces 17 and 18 of the bearing bush 15 with individual pockets 30 and 31, respectively, distributed on the periphery and supplied with lubricant under pressure by separate pumps 32 and 33 (FIG. 2), thus forming liquid pads, against which bear the rings 19 and 20 of the spindle 12. The rings 19 and 20 co-operate with the end surfaces 17 and 18 of the bearing bush 15 so as to form throttling gaps for the discharge of pressure lubricant from the pockets 30 and 31. This not only results in a small friction loss at the surfaces 17 and 18, but by suitably arranging the lubricant supply, it is also possible to prevent with certainty metallic contact of the surfaces 17 and 18 with the rings 19 and 20. Since the pressure in the pockets varies very considerably with variation in the width of the discharge gap between the co-operating surfaces, considerable adjusting forces are immediately produced with slight inclination of the spindle 12 to the bearing bush 15, so that friction in the pivots 22 is easily overcome.

It may also suffice to provide a number of pockets on only one of the surfaces 17 or 18, for example in the surface 17, and in the case of the other surface to provide only a single annular pocket.

In the case of bearing 14, substantially the same device is provided for permitting adjustability as in the case of bearing 12. According to FIGS. 6 and 7, the bearing bush 16' is provided laterally with projections 34 which rest rotatably on horizontal-axis pivots 35 at right-angles to the spindle axis. The pivots 35 lie with their lower halves in corresponding recesses of a fixed bearing member 36 of the headstock. A bolt 37 with nut 38 and passing with clearance through the pivot 35 is again used for fixing the bearing bush.

The radial bearing 14 is also constructed as hydrostatic bearing. Accordingly, the sliding surface of the bearing bush 16 is provided with a number of pockets 39, distributed on the periphery and supplied with lubricant in the same way as the pockets 28 of the bearing bush 15 by means of separate pumps 40 (FIG. 3).

Since, in these pockets, the pressure of the lubricant is practically constant over the entire length axially, the liquid pads in the case of inclination of the spindle 12, are unable to exert a torque on the bearing bush 16. In an axial extension 41 of the bearing bush 16, therefore, a separate cylindrical control surface 42 is provided, which surrounds the spindle 12 with approximately the same clearance as the bearing bush 16 itself. This surface 42 is provided with two pockets 43 which again, as is known in the case of hydrostatic bearings, are so provided with lubricant that in each pocket, a pressure is adjusted which is dependent on the gap width between control surface 42 and spindle 12. For this purpose, separate pumps 44 are connected to the pockets 43, each of which pumps supplies under pressure the same quantity of lubricant to the corresponding pocket.

The pockets 43 are offset in the axial direction of the spindle 12 by an amount $a$ (FIG. 6) relatively to the pivots 35, so that the pressure of the lubricant in the pockets 43 exerts a torque on the bearing bush 16. One of the two pockets 43 is situated above and the other below (FIG. 6). If the spindle 12 is central in the control surface 42, the discharge gaps for the two pockets are equal in size. The same pressure is thus adjusted in both pockets, and since the pockets are diametrically opposite, the forces exerted by the lubricant pressure on the projection 41 of the bearing bush cancel each other.

If, on the contrary, due to a deflection of the spindle 12, the part co-operating with the control surface 42 moves upwardly, the discharge gap of the upper pocket 43 will become smaller and that of the lower pocket 43 larger. The lubricant pressure therefore increases in the upper pocket and decreases in the lower pocket. Equilibrium is disturbed. The forces exerted on the projection 41 of the bearing brush 16 give an upwardly directed resultant which with regard to the pivots 35 exerts a torque on the bearing bush 16 in the clockwise direction. The bearing bush therefore turns in the same direction of rotation on the pivots 35 until it has reached the same inclination as the spindle and the condition of equilibrium is re-established by centering of the control surface 42 with respect to the spindle 42.

In the present case, in which only one possibility of pivoting of the bearing bush 16 about the horizontal axis is provided, the two pockets 43 shown in the control surface 42 are sufficient. In the case of pivotability in all directions, at least three pockets uniformly distributed on the periphery and supplied with pressure liquid would have to be provided in the control surface.

Instead of the cylindrical surface 42, without departing from the principle of the invention, for the co-operation of the bush 16 with the spindle 12, any other surface of revolution with inclination with respect to the spindle axis could also be provided, the pockets then being disposed offset in the tangential direction of said surface of revolution relatively to the pivot axis of the bearing bush, so that the pressure in the pockets exerts a torque on the bearing bush turning about the pivot axis.

Apart from spindles for machine tools, the mounting described may also be used for other shafts which have to adapt themselves to the particular load in operation, for example for the shaft of a Pelton turbine loaded by the jet pressure which is variable during operation.

What is claimed is:

1. In a bearing of a machine tool in combination a fixed bearing member; a bearing bush mounted pivotally in said fixed bearing member so as to allow angular displacement about an axis extending at right-angles to the axis of the bearing bush; a spindle mounted for rotation in said bush; said bush having end faces extending at right-angles to the spindle axis and each end face having pockets with separate pressure lubricant supply means; and said spindle being provided with shoulders co-operating with said end faces of the bearing bush so as to define a throttling gap for the discharge of the pressure lubricant from said pockets.

2. In a bearing of a machine tool in combination a fixed bearing member; a bearing bush mounted pivotally in said fixed bearing member so as to allow angular displacement about an axis extending at right-angles to the axis of the bearing bush; a spindle mounted for rotation in said bush; said spindle and said bearing bush having cylindrical surfaces of revolution co-operating with one another; said surface of revolution of the bush being formed in axial extensions of the bearing bush and being provided with pockets opening toward said surface of revolution of the spindle and having separate pressure lubricant supply means, said surfaces of revolution defining a throttling gap for the discharge of the pressure lubricant of said pockets.

3. In combination a fixed bearing member, a bearing bush pivotally mounted in said fixed bearing member so as to allow angular displacement about an axis perpendicular to the axis of the bearing bush, said bush having a cylindrical bearing surface to support transverse load in the region of the pivot axis of the bush; a spindle mounted for rotation in said bush; at least one extension of the bearing bush axially spaced from said pivot axis and formed with a first control surface; a second control surface carried by the spindle and coacting with the first control surface to define therebetween a gap, the first control surface being provided with at least two pressure fluid containing pockets opening toward the second control surface; and separate pressure fluid supply means connected to each of said pockets, said pockets being disposed so that fluid pressure variation resulting from variations in the width of said gap produces the torques necessary for automatically aligning the axis of the pivotally mounted bearing bush with the axis of the spindle.

4. The combination defined in claim 3 in which the control surfaces are cylindrical and coaxial with the spindle.

5. The combination defined in claim 4 in which the extension of the bush which forms the first control surface consists of diametrically oppositely arranged axial projections of the bearing bush, each being provided with a pressure fluid pocket opening toward the surface of the spindle.

6. The combination defined in claim 3 in which the control surfaces are annular and disposed coaxially with and at right angles to the spindle axis.

7. The combination defined in claim 3 in which the bearing surface for supporting said transverse load is provided, in the region of the pivot axis, with an annular series of pressure lubricant pockets so as to form a hydrostatic bearing.

8. In combination a fixed bearing member provided with a pair of recesses of about half circular cross-section; a bearing bush; a pair of lateral projections carried by said bearing bush and having therein recesses of about half circular cross-section and arranged in opposing relation to the recesses in the fixed bearing member; cylindrical pivots engaged between said opposed recesses, and having their axes aligned and perpendicular to the axis of the bearing bush, said bearing bush having a cylindrical bearing surface to support transverse load in the region of the pivot axis of the bush; flexible bolts passing with clearance through openings in said pivots so as to connect the lateral projections with the fixed bearing member, clearance being left between the lateral projections and the fixed bearing member to allow pivotal movement of the bearing bush; a spindle mounted for rotation in said bush; at least one extension of the bearing bush axially spaced from said pivot and formed with a first control surface; a second control surface carried by the spindle and coacting with the first control surface to define therebetween a gap, the first control surface being provided with at least two pressure fluid containing pockets opening toward the second control surface; and separate pressure fluid supply means connected to each of said pockets, said pockets being disposed so that fluid pressure variation resulting from variation in the width of said gap produces the torques necessary for automatically realigning the axis of the pivotally mounted bearing bush with the axis of the spindle.

References Cited by the Examiner
UNITED STATES PATENTS

| | | | |
|---|---|---|---|
| 558,642 | 4/96 | Fayol | 308—72 |
| 1,607,318 | 11/26 | Spillmann | 308—9 |
| 1,906,715 | 5/33 | Penick. | |
| 2,578,711 | 12/51 | Martellotti | 308—122 |
| 2,998,999 | 9/61 | Morser et al. | 308—122 |
| 3,016,273 | 1/62 | Benoit | 308—72 |

ROBERT C. RIORDON, *Primary Examiner.*
FRANK R. SUSKO, *Examiner.*